(12) United States Patent
Chen et al.

(10) Patent No.: US 7,924,439 B2
(45) Date of Patent: Apr. 12, 2011

(54) METHOD AND SYSTEM FOR PARAMETER EXTRACTION OF A CUTTING TOOL

(75) Inventors: Tian Chen, Shanghai (CN); Kevin George Harding, Niskayuna, NY (US); Steven Robert Hayashi, Niskayuna, NY (US); Xiaoming Du, Shanghai (CN); Jianming Zheng, Shanghai (CN); Howard Paul Weaver, Mason, OH (US); James Allen Baird, Amelia, OH (US); Xinjue Zou, Shanghai (CN); Kevin William Meyer, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 193 days.

(21) Appl. No.: 12/419,051

(22) Filed: Apr. 6, 2009

(65) Prior Publication Data

US 2010/0079769 A1      Apr. 1, 2010

Related U.S. Application Data

(63) Continuation-in-part of application No. 12/240,295, filed on Sep. 29, 2008.

(51) Int. Cl.
  *G01B 11/24*  (2006.01)
(52) U.S. Cl. ........................................ 356/601; 356/607
(58) Field of Classification Search .......... 356/601–602, 356/607–608, 431, 2, 3, 9, 15–18, 237.1–237.5; 250/559.22, 559.23, 221, 236, 559.27, 559.4, 250/559.44, 559.19
See application file for complete search history.

(56) References Cited

U.S. PATENT DOCUMENTS

| 3,692,414 | A | 9/1972 | Rosteman |
| 3,710,128 | A | 1/1973 | Kubisiak |
| 4,583,854 | A | 4/1986 | Lozar |
| 4,736,247 | A | 4/1988 | Graham |
| 4,745,290 | A | 5/1988 | Frankel |
| 4,966,460 | A | 10/1990 | Kahley |
| 5,477,371 | A | 12/1995 | Shafir |
| 5,568,260 | A | 10/1996 | Schneiter |

(Continued)

FOREIGN PATENT DOCUMENTS

EP      1580521 A      9/2005

(Continued)

OTHER PUBLICATIONS

G F Dalgleish, R D James and K H Randeree, University of Hull; D R Aitchison, University of Teeside; Title:Laser-based inspection of cutting tools for advanced manufacturing system; http://ieeexplore.ieee.org/iel3/5058/13842/00644268.pdf?arnumber=644268.

(Continued)

*Primary Examiner* — Gregory J Toatley
*Assistant Examiner* — Tri T Ton
(74) *Attorney, Agent, or Firm* — Penny A. Clarke

(57) ABSTRACT

A method for extracting parameters of a cutting tool is provided. The method comprises positioning the cutting tool on a moveable stage, performing one or more rotary scans of a first section of the cutting tool to generate a scanning point cloud, indexing a plurality of points of the scanning point cloud, detecting one or more feature points based on the indexed scanning point cloud, and extracting one or more parameters based on the detected feature points. A system for extracting the parameters is also presented.

18 Claims, 7 Drawing Sheets

U.S. PATENT DOCUMENTS

| | | | |
|---|---|---|---|
| 5,570,186 | A | 10/1996 | Satzger |
| 5,708,279 | A | 1/1998 | Cheng |
| 5,846,081 | A | 12/1998 | Bushway |
| 6,006,126 | A * | 12/1999 | Cosman .................. 600/426 |
| 6,788,807 | B1 | 9/2004 | Norita |
| 6,927,863 | B2 | 8/2005 | Gurny |
| 7,027,145 | B2 | 4/2006 | Segall |
| 7,269,471 | B2 | 9/2007 | Kadono |
| 2002/0154396 | A1 | 10/2002 | Overbeck |
| 2004/0263863 | A1 | 12/2004 | Rogers |
| 2007/0124015 | A1 | 5/2007 | Chen et al. |
| 2008/0030498 | A1 * | 2/2008 | Chang et al. ............. 345/419 |
| 2008/0148590 | A1 | 6/2008 | Hayashi |

FOREIGN PATENT DOCUMENTS

| | | |
|---|---|---|
| EP | 1797992 A1 | 6/2007 |
| JP | 2008196989 A1 | 8/2008 |

OTHER PUBLICATIONS

Li, Xiaoqian (Intgd. Mfg. Technologies Institute, National Research Council Canada); Wang, Lihui; Cai, Ningxu Title:Machine-vision-based surface finish inspection for cutting tool replacement in production International Journal of Production Research, v 42, n 11, Jun. 1, 2004, p. 2279-2287 Publisher:Taylor and Francis Ltd.

Yan X. Shirase K. Hirao M. Yasui T. Title: Extraction and optimisation of cutting conditions for 2½-axis milling International journal, advanced manufacturing technology 2000, vol. 16, No. 10, pp. 695-699 (16 ref.) Publisher: Springer, London, Royaume-Uni.

An International Search Report dated Mar. 25, 2008 for International Application No. PCT/US2007/085994 (4 pages).

EP1580521 Abstract, Sep. 28, 2005.

* cited by examiner

METHOD AND SYSTEM FOR PARAMETER EXTRACTION OF A CUTTING TOOL

CROSS REFERENCE TO RELATED APPLICATIONS

This application is a continuation-in-part application of Nonprovisional application Ser. No. 12/240,295, filed Sep. 29, 2008, the contents of which are hereby incorporated by reference.

BACKGROUND

This invention relates generally to methods and systems for parameter extraction of objects. More particularly, this invention relates to methods and systems for parameter extraction of cutting tools.

Various types of cutting tools are known and used for machining objects, such as engine blades. Each cutting tool has associated parameters, such as primary relief angle, flute spacing, rake angle and so forth, to define a shape and a profile thereof. Typically, performance of the machined objects may depend on the parameters of the cutting tools. Accordingly, inspection of the cutting tools is required from time-to-time to ensure a desired performance of the cutting tools. In general, the parameters associated with the cutting tools are estimated and compared to desired values for determining the cutting performance of the cutting tools.

Different parameter extraction methods for the cutting tools are employed to determine the parameters of such cutting tools. For example, the cutting tools are sliced, and an optical comparator or a hard gage is employed to extract the parameters at any section of the sliced cutting tools. However, this technique requires physical slicing of the cutting tools, thereby making them unusable for future machining. In addition, certain methods employ image-processing techniques for estimating the tool parameters from captured projections. However, such parameter extraction methods are limited to estimation of a minority of the tool parameters and are unable to provide extraction for all of the parameters associated with the cutting tools. Further, existing parameter extraction techniques for the cutting tools are time-consuming, relatively expensive and are less accurate than desired.

Therefore, there is a need for a new and improved method and system for extraction of parameters of cutting tools.

BRIEF DESCRIPTION

A method for extracting parameters of a cutting tool is provided. The method comprises positioning the cutting tool on a moveable stage, performing one or more rotary scans of a first section of the cutting tool to generate a scanning point cloud, indexing a plurality of points of the scanning point cloud, detecting one or more feature points based on the indexed scanning point cloud, and extracting one or more parameters based on the detected feature points.

Another embodiment of the invention further provides a system for extracting parameters of a cutting tool. The system comprises a stage configured to position the cutting tool, a range sensor configured to scan the cutting tool, and a controller. The controller is configured to control the range sensor to perform one or more rotary scans of a first section of the cutting tool to generate a scanning point cloud, to index a plurality of points of the scanning point cloud, to detect one or more feature points based on the indexed scanning point cloud, and to extract one or more parameters based on the detected feature points.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

Embodiments of the present disclosure are described herein with reference to the accompanying drawings. In the subsequent description, well-known functions or constructions are not described in detail to avoid obscuring the disclosure in unnecessary detail.

Figure 1:
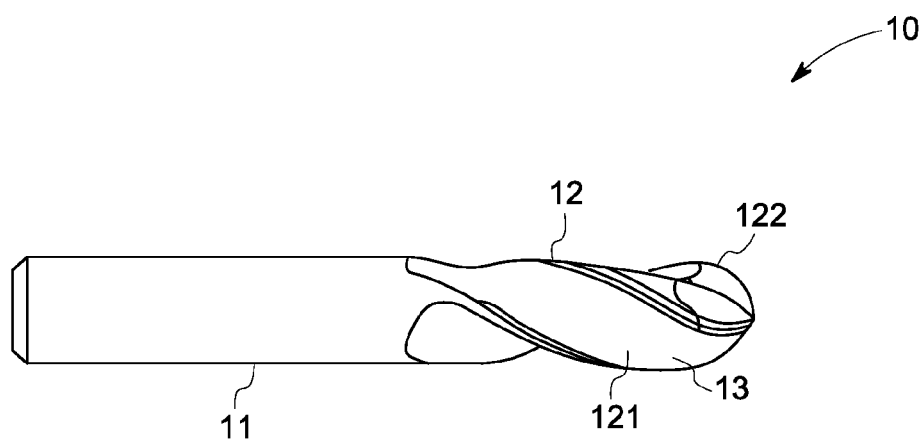
FIG. 1 is a perspective view of an example cutting tool.

In embodiments of the invention, parameters of different types of cutting tools, such as ball end mills, flat end mills, drills and reamers may be extracted. Referring to FIG. 1, a cutting tool 10, such as a ball end mill is illustrated. It should be noted that the invention is not limited to any particular type of cutting tools. Rather, the example depicted in FIG. 1 is merely illustrative. The illustrated cutting tool 10 comprises a shank 11 and a cylindrical cutting body 12. The cutting body 12 comprises a side portion 121 and a tip 122. In the illustrated example, the tip 122 comprises a rounded tip. For other cutting tools, the tip 122 may comprise other shapes, such as a flat tip when the cutting tool 10 comprises a flat end mill.

In the illustrated example, the cutting body 12 comprises multiple cutting edges and multiple flutes 13 based on a desired profile of machined parts. In one example, a two-flute mill may be employed for cutting slots or grooves. A four-flute mill may be used for a surface milling operation. The cutting tool 10 has a plurality of parameters associated with the cutting body 12. Non-limiting examples of the parameters comprise flute spacing, an axial primary relief angle, a radial primary relief angle, a radial rake angle, concentricity, a core diameter, an axial rake angle, and a helix angle, for the illustrated example.

Figure 2:
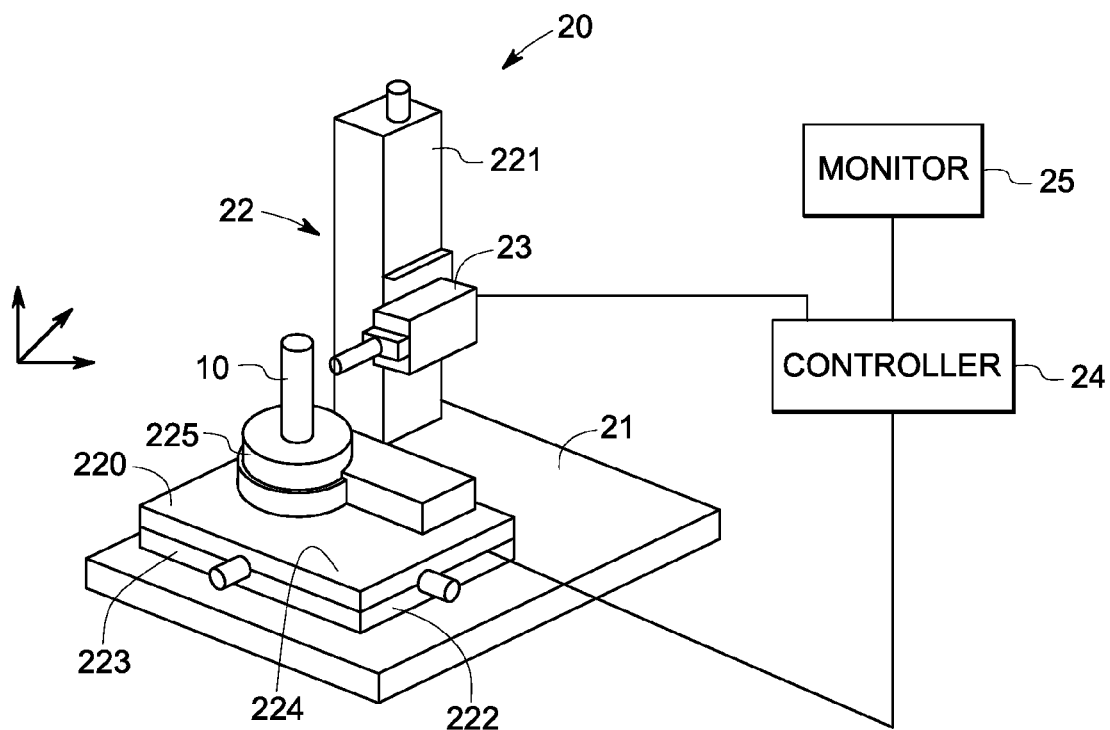
FIG. 2 is a schematic diagram of a measurement system for extracting parameters of the cutting tool in accordance with one embodiment of the invention.

FIG. 2 is a schematic diagram of a measurement system 20 for extracting the parameters of the cutting tool 10 in accordance with one embodiment of the invention. As illustrated in FIG. 2, the measurement system 20 comprises a base 21, a stage 22, a range sensor 23, and a controller 24. In the illustrated embodiment, the stage 22 comprises a first stage 220 and a second stage 221. The first stage 220 is moveably disposed on the base 21 and comprises a positioning element 222 comprising a bottom element 223 and an upper element 224 stacked together. In one embodiment, the bottom element 223 and the upper element 224 may move along an X-axis and a Y-axis relative to the base 21, respectively. Additionally, the first stage 220 may further comprise a rotatable element 225 rotatably disposed on the upper element 224 for holding the cutting tool 10. Accordingly, the cutting tool 10 may move along the X-Y-axis and rotate about a Z-axis relative to the base 21 with the linear movement of the positioning element 222 and rotation of the rotatable element 225.

In one non-limiting example of the invention, the first stage 220 may move along the X-axis within a range of approximately zero millimeters to approximately fifty millimeters with a resolution of approximately 0.1 micrometers, and may move along the Y-axis within a range of approximately zero millimeters to approximately one hundred millimeters with a resolution of approximately 0.1 micrometers. In other embodiments, the first stage 220 may move along the X-axis and/or the Y-axis within other suitable ranges having any suitable resolution. Additionally, the rotatable element 225 may rotate approximately 360 degree with a resolution of approximately 0.0001 degrees. Alternatively, the rotatable element 225 may rotate within other suitable ranges with other suitable resolutions.

In the illustrated embodiment, the second stage 221 is fixedly disposed on the base 21 to moveably hold the range sensor 23 and adjacent to the first stage 220. In one example, the range sensor 23 may move on the second stage 221 along the Z-axis. In more particular examples, the range sensor 23 may move along the Z-axis within a range of approximately zero millimeters to approximately 250 millimeters with a resolution of approximately 0.1 micrometers. In other embodiments, the range sensor 23 may move along the Z-axis within other suitable ranges and with other suitable resolutions.

In certain embodiments, the range sensor 23 may also move on the second stage 221 along the X-axis and Y-axis within a range and with a resolution substantially similar to these of first stage 220. In other embodiments, the second stage 221 may be moveably disposed on the base 21. Accordingly, in embodiments of the invention, the controller 24 may control the first stage 220 and the second stage 221 to cooperate to position the range sensor 23 at variable distances from the cutting tool 10 to measure the points on the cutting tool 10.

In the illustrated embodiment, the controller 24 comprises at least one of a computer, a database, and/or a processor to control the movement of the stage 22 and the range sensor 23, and to store and analyze the measured data points from the range sensor 23. It should be noted that the present invention is not limited to any particular computer, database or processor for performing the processing tasks of the invention. The term "computer", as that term is used herein, is intended to denote any machine capable of performing the calculations, or computations, necessary to perform the tasks of the invention. The term "computer" is intended to denote any machine that is capable of accepting a structured input and of processing the input in accordance with prescribed rules to produce an output. It should also be noted that the phrase "configured to" as used herein means that the computer is equipped with a combination of hardware and software for performing the tasks of the invention, as will be understood by those skilled in the art. Additionally, the measurement system 20 may further comprise a monitor 25, such as a LCD to display data.

Figure 3:
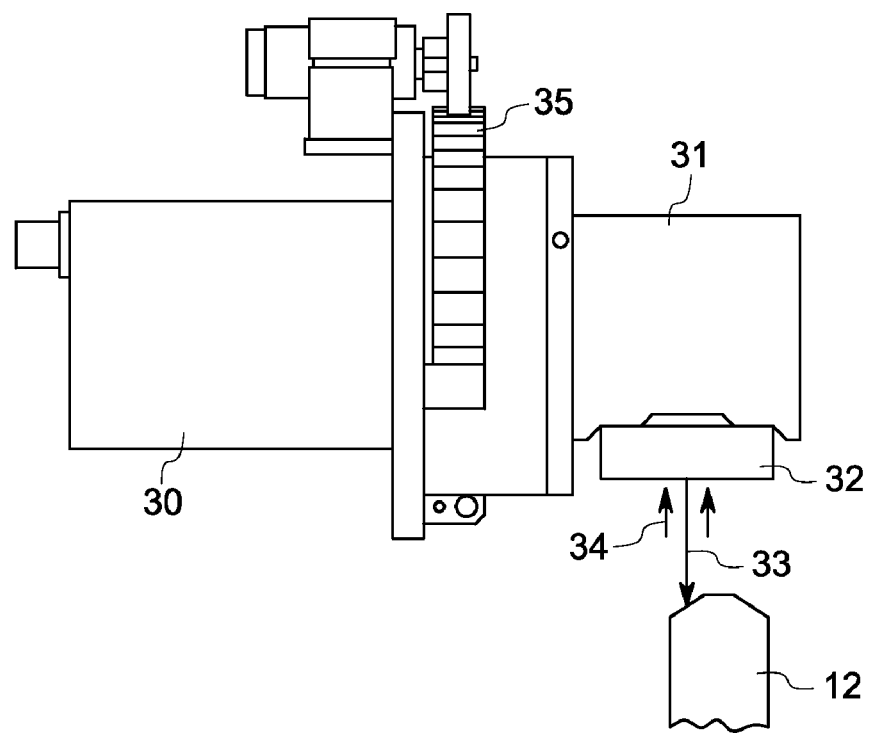
FIG. 3 is a schematic diagram of a range sensor of the measurement system in FIG. 2.

FIG. 3 illustrates a schematic diagram of an example range sensor 23. In the illustrated example, the range sensor 23 comprises an optical sensor 30 and a periscope 31 coupled to the optical sensor 30. The optical sensor 30 comprises a conoscopic sensor, such as the Optimet Smart Probe described in U.S. Pat. No. 5,953,137. The periscope 31 further comprises a lens 32. Alternatively, the optical sensor 30 may be another suitable ranging sensor.

In the illustrated embodiment, a light source (not shown) generates and directs a beam of light 33, such as a laser with a wavelength of 670 nm on a point of the cutting tool 10 after the light 33 passes through the optical sensor 30 and the periscope 31 in turn. Then, a beam of reflected light 34 is generated because of diffusion of the light 33 on the point of the cutting tool 10. The diffused light 34 passes through the periscope 31 and is detected by the optical sensor 30. Subsequently, the controller 24 (shown in FIG. 2) retrieves a distance of the point on the cutting tool 10 from the optical sensor 30 and extracts the parameters of the point by analyzing information in the detected light 34, which is known to one skilled in the art. In one or more embodiments of the invention, with the rotation of the cutting tool 10, the optical sensor 30 may detect diffused light from different points on the cutting tool 10 so that the controller 24 extracts the parameters of the cutting tool 10.

In one embodiment, the controller 24 may determine the distance with an accuracy of approximately ±1.5 microns based on the information in the detected lights by the range sensor 23. In other embodiments, the controller 24 may determine the distance with other suitable accuracy. In the illustrated embodiment, the incident light 33 has a frequency of up to approximately 3000 kilohertz. Alternatively, the incidence light 33 may have another suitable frequency.

For the arrangement illustrated in FIG. 3, the range sensor 23 further comprises a rotation mechanism 35 coupled to the periscope 31. In one embodiment, the controller 24 may control the rotation mechanism 35 to rotate the periscope 31 within a range of approximately zero degree to approximately ninety degree, or other suitable ranges. Thus, in embodiments of the invention, the rotation mechanism 35 rotates the periscope 31 to enable the lens 32 to align with the points on the side portion 121 or the tip 122 (shown in FIG. 1) of the cutting body 12. In certain embodiments, the optical sensor 30 may also be rotatable.

As illustrated in FIGS. 1-3, during operation, the controller 24 controls the range sensor 23 and the first stage 220 holding the cutting tool 10 to move cooperatively so that the lens 32 first aims at a first desired section of the side portion 121 of the cutting body 12 with an appropriate distance therebetween. Then, the measurement system 20 rotates the cutting tool 10 while the light 33 scans along the first desired section with the rotation of the cutting tool 10. Meanwhile, the range sensor 23 detects the detected light 34 diffused from the first desired section and outputs the detected information in the light 34 to the controller 24 for analyzing to retrieve a first scanning point cloud of the first desired section of the cutting tool 10. Accordingly, in some non-limiting examples, the controller 24 may analyze the first scanning point cloud to extract the parameters of the first section. In one embodiment, the controller 24 may adjust the power of the light source for subsequent scans based on the signal to noise ratio of the detected light 34.

In certain applications, the complex geometry of the cutting body 12 and limited working range of the range sensor 23 may cause the first scanning point cloud to miss some points of the first desired section. In certain examples, the measurement system 20 may move adaptively the cutting tool 10 to perform a subsequent scan to supplement the points absent based on the first scanning point cloud, which is described in the Nonprovisional application Ser. No. 12/240,295, filed Sep. 29, 2008.

Alternatively, in some non-limiting examples, prior to the parameter extraction of the first section based on the first scanning point cloud, the system 20 may segment the first scanning point cloud and perform a second scan of the first section based on the segmentation of the first scanning point to retrieve a second scanning point of the first section, which is described below. Then, the controller 24 may analyze the second scanning point cloud to extract the parameters of the first section.

Figure 4A:
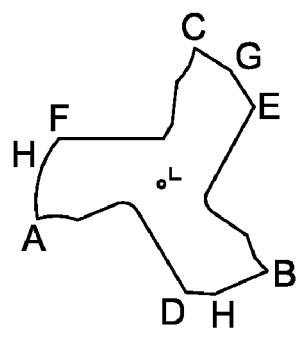
FIGS. 4(a)-4(b) are schematic diagrams illustrating segmentation of a first scanning point cloud of an object.
Figure 4B:
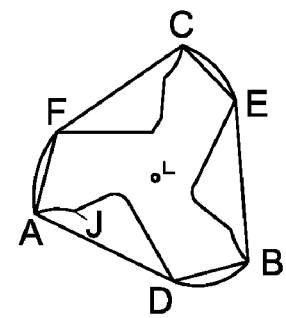

FIGS. 4(a)-4(b) illustrates exemplary diagrams illustrating segmentation of a first scanning point cloud of an object (not shown). For the example illustrated in FIG. 4(a), the controller 24 first analyzes a convex hull of the first scanning point cloud of the object to identify feature points thereon, such as cutting edge points including the points A, B and C, and other feature points, such as the points D, E, F, G, H and I. Then, the controller 24 calculates a distance of two adjacent feature points according to a certain order and compares the distance with a predetermined value therein. In one example, when the distance is larger than or equal to the predetermined value, the controller 24 would identify these points, such as the points A, D, B, E, C and F. Thus, a first segmentation of the first scanning point cloud is performed based on the segment of these feature points. For the example illustrated in FIG. 4(a), the first scanning point cloud is segmented into six segments based on the convex hull analysis.

As illustrated in FIG. 4(b), the controller 24 analyzes each segment in the first segmentation to perform a second segmentation. In one or more embodiments of the invention, each point in the first scanning point cloud has a normal perpendicular to a tangent of the point. Taking the point cloud in the segment AD as an example, the controller 24 may analyze a normal of each point on the point cloud successively from the point A to the point D. When an angle between the normal of a point, such as the point J and the normal of the point A approximates or is equal to a predetermined angle, such as 80 degrees, the controller 24 defines the point cloud between the two points A and J as a scanning path. Similarly, the point cloud between A and D is segmented into different scanning paths. In this manner, the second segmentation for the first scanning point cloud may be implemented.

Figure 5:
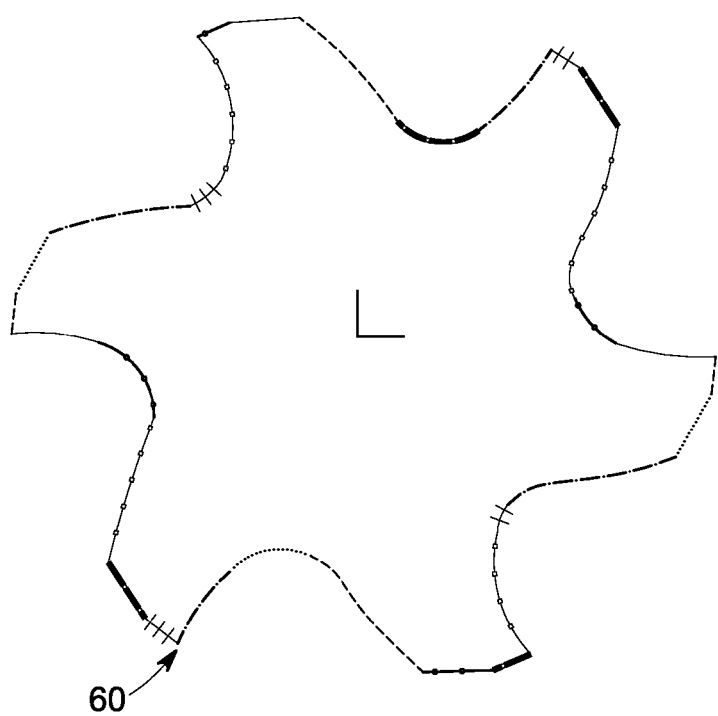
FIG. 5 is a schematic diagram of example scanning paths of a first scanning point cloud of an example cutting tool.
Figure 6:
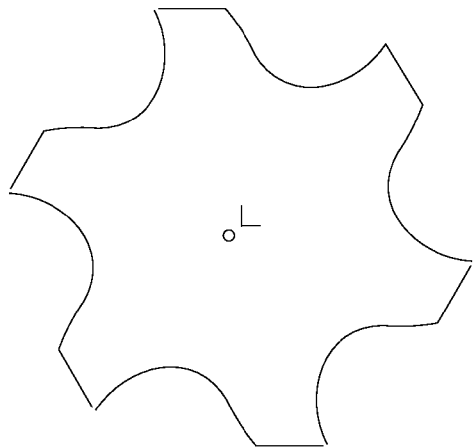
FIG. 6 is a second scanning point cloud diagram of the cutting tool shown in FIG. 5.

Similar to the first and second exemplary segmentations shown in FIGS. 4(a)-4(b), as illustrated in FIG. 5, the first scanning point cloud of the cutting tool 10 may be segmented into different scanning paths, which are illustrated by lines 60 with different symbols. In this non-limiting example, the first scanning point cloud is segmented into 30 scanning paths. Then, the measurement system 20 performs the second scan to scan the first desired section of the side portion 121 of the cutting body 12 along the different scanning paths in the second segmentation shown in FIG. 5 to retrieve the second scanning point cloud of the first section shown in FIG. 6. In certain applications, the second scanning point cloud may have higher accuracy than the first scanning point cloud so that the controller 24 may analyze the second scanning point cloud to extract the parameters of the first section.

Other discussion for obtaining the first and/or second scanning point cloud of a section may be found in the Nonprovisional application Ser. No. 12/240,295, filed Sep. 29, 2008, which is incorporated herein by reference.

In certain examples, the first scanning point cloud or the second scanning point cloud may be defined as a point cloud, thus, the controller 24 may extract the parameters based on the point cloud. In some embodiments, before extracting the parameters based on the point cloud, the point cloud may be preprocessed in the controller 24 so as to improve the quality thereof. Before preprocessing, the point cloud may be transformed to the X-Y plane of a Cartesian co-ordinate system for the preprocessing. In one example, the second scanning point cloud may be preprocessed for subsequent parameter extraction.

Figure 7:
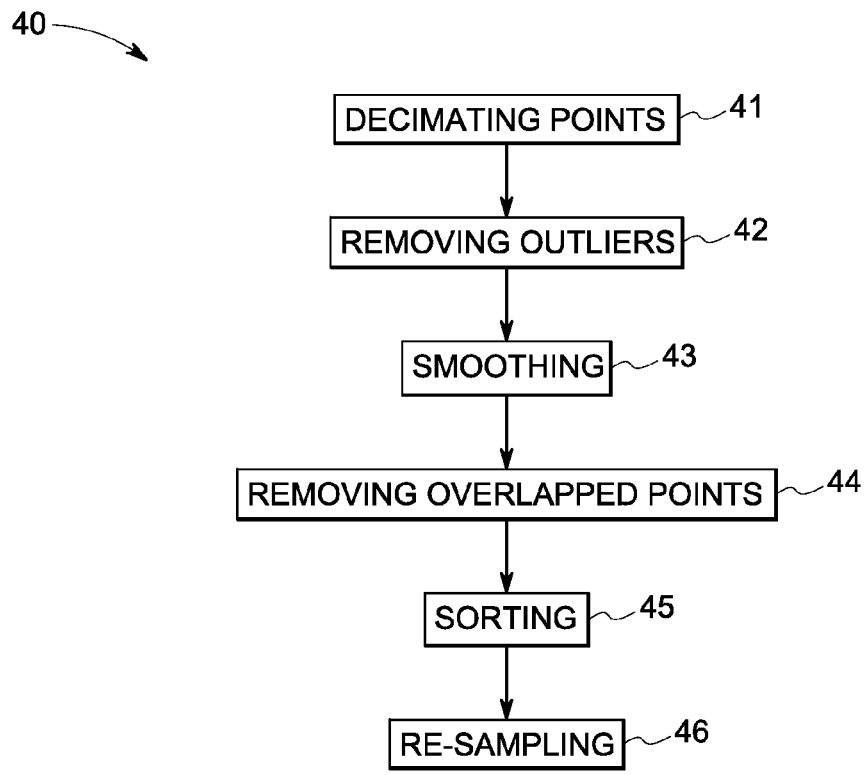
FIG. 7 is a flowchart for preprocessing of a point cloud.

FIG. 7 illustrates a flowchart 40 for preprocessing the point cloud, such as the first scanning point cloud or the second scanning point cloud. It should be noted that the sequence of steps 41-44 is only illustrative and may be varied. In some examples, one or more of the steps in the flowchart 40 may be omitted.

In the illustrated embodiment in FIG. 7, when preprocessing, in step 41, the point cloud may be decimated to remove redundant points thereon by using a Quadrant Tree (Quad tree) Structure, so that the points on the point cloud may be partitioned and distributed relatively uniformly after decimation. In one non-limiting example, the distance (sample distance) between two adjacent points on the point cloud after decimation may be predetermined, so that the point cloud may be decimated based on the sample distance.

In some applications, the point cloud may have outliers, which may include a cluster of points whose size is smaller than a threshold cluster size and whose distance to neighboring points may exceed a threshold distance. In certain examples, the neighboring points of the outliers may be detected by using a K-dimensional tree structure to analyze the point cloud. Thus, in step 42, the outliers on the point cloud may be determined and removed.

In certain applications, although the redundant points and/or the outliers on the point cloud are removed in the steps 41 and 42, some points may be still distributed unevenly so that the points may not be suitable for the subsequent parameter extraction. Thus, in step 43, the point cloud may be smoothed, for example by employing a Gaussian smooth filter. In some examples, step 43 may be performed prior to or without steps 41 and/or 42.

Additionally, the point cloud may include some overlapping points having the same normal direction. Accordingly, the normal and curvature of every point on the point cloud may be estimated by a Principle Component Analysis (PCA) method. If the distance between a point and its neighborhood point is below a first threshold value, and an angle between the normals of the point and the neighborhood points is below a second threshold value, the point may be regarded as the overlapping point. The first and second threshold values may be predetermined, and the neighborhood points of one point may be determined by using a K-dimensional tree structure to analyze the point cloud. Accordingly, in step 44, overlapping points in normal directions may be removed.

After being preprocessed in one or more of steps 41-44, the points on the point cloud may be sorted in step 45, and connected to form a polygon loop, so that a preprocessed point cloud may be obtained. In some embodiments, after sorting, the preprocessed point cloud may be re-sampled uniformly in step 46 so that a certain number of points (such as 6000 points) are sampled to refine the preprocessed point cloud.

Figure 8:
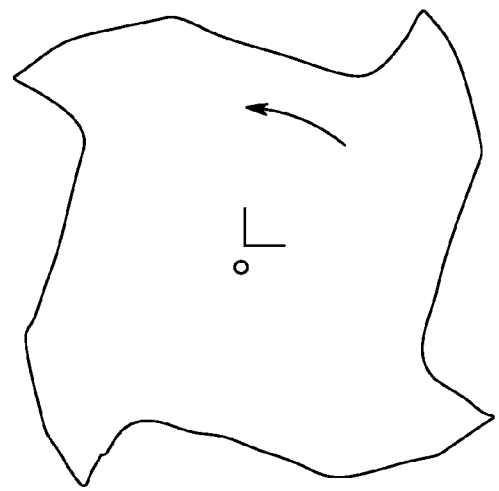
FIG. 8 is a schematic diagram illustrating indexing of points on an example preprocessed point cloud of an object.

In some embodiments, after preprocessing, the controller 24 may index each point within the preprocessed point cloud, so that each of these points has an index and may be positioned by the corresponding index. FIG. 8 illustrates indexing of points on an exemplary preprocessed point cloud 50 of a cutting tool (not shown). It should be noted that the exemplary preprocessed point cloud 50 is only illustrative and may have other shapes. In other applications, the indexing may or may not be employed when the parameters are extracted based on a point cloud without preprocessing.

As illustrated in FIG. 8, a start point is indexed as Point[0]. In some examples, if located at relief regions or around feature points, such as cutting edge points, primary relief points, or secondary clearance points, the position of the start point may be adjusted to avoid being located at the relief regions or around the feature points.

Generally, different cutting tools may have different working modes, such as right cutting and left cutting modes so that an indexing direction of a point cloud may be counterclockwise or clockwise, for example, from cutting edge points to respective rake regions, or from primary relief points to respective cutting edge points In one non-limiting example, the indexing direction of the exemplary preprocessed point cloud 50 is counterclockwise. Accordingly, in one example, if the indices of a cutting edge point and a primary relief point adjacent to the cutting edge point are Point[i] and Point [j] respectively, the numeral "i" is larger than the numeral "j". If the numeral "i" is smaller than the numeral "j", the indexing of the points may be performed again according to the counterclockwise indexing direction. Alternatively, in other applications, the indexing direction may be clockwise.

Figure 9:
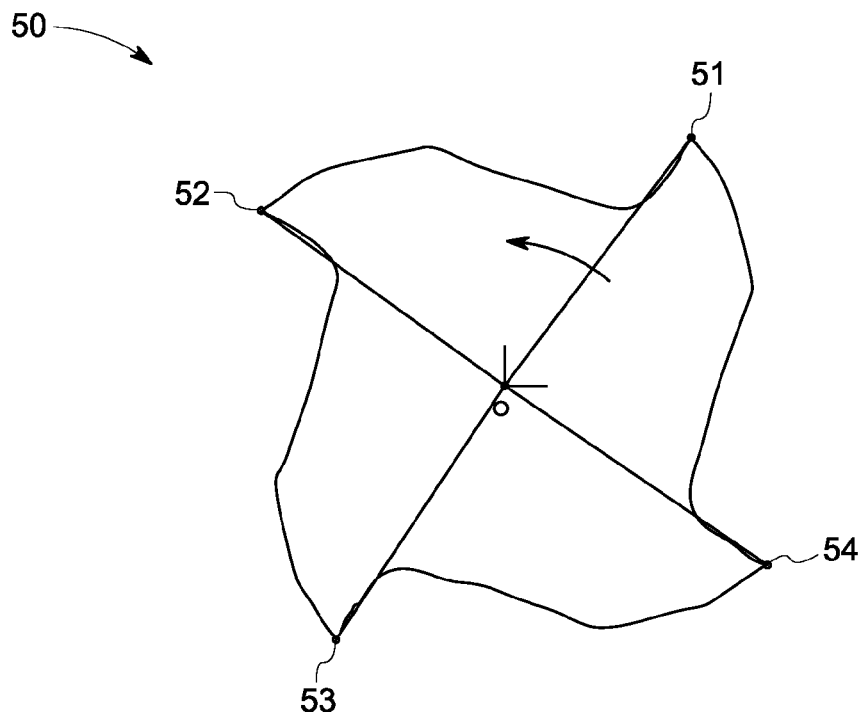
FIG. 9 is a schematic diagram illustrating detection of initial cutting edge points on the example preprocessed point cloud.

After indexing the points, the controller 24 may analyze the preprocessed point cloud 50 to detect some feature points, such as the cutting edge points. FIG. 9 illustrates a schematic diagram showing detection of initial cutting edge points on the exemplary preprocessed point cloud 50. Alternatively, the initial cutting edge points may be detected without preprocessing the point cloud.

As illustrated in FIG. 9, the controller 24 may analyze distances of the points on the point cloud 50 from a center point O and find a point 51 having a furthest distance away from the center point O, which may be the first initial cutting edge point. Since a flute number (in the illustrated example, the flute number is 4) and the point number, such as 6000 on the point cloud 50 can be obtained, other cutting edge points may be determined based on the index of the first cutting edge point. For example, assuming the index of the first cutting edge point is Point[a], the point number of the point cloud is B, and the flute number is C, an index of a second initial cutting edge point 52 may be Point[a+B/C]. An index of a third initial cutting edge point 53 may be Point[a+2*B/C]. Similarly, an index of a fourth initial 54 cutting edge point may be Point[a+3*B/C]. Since every point has an index in the point cloud 50, positions of the initial cutting edge points 51-54 can be detected using the respective indices. Similarly, indices of initial cutting edge points of point clouds having other shapes may also be determined.

In certain applications, due to the complexity of a cutting tool, initial cutting edge points 51-54 may not reflect the actual status of physical cutting edge points on the cutting tool, which may be disadvantageous to the subsequent parameter extraction. Accordingly, in some embodiments, the controller 24 may analyze the initial cutting edge points on the exemplary point cloud 50 to retrieve refined cutting edge points, which may be more accurate than the initial cutting edge points to reflect the cutting edge points of the cutting tool.

Figure 10:
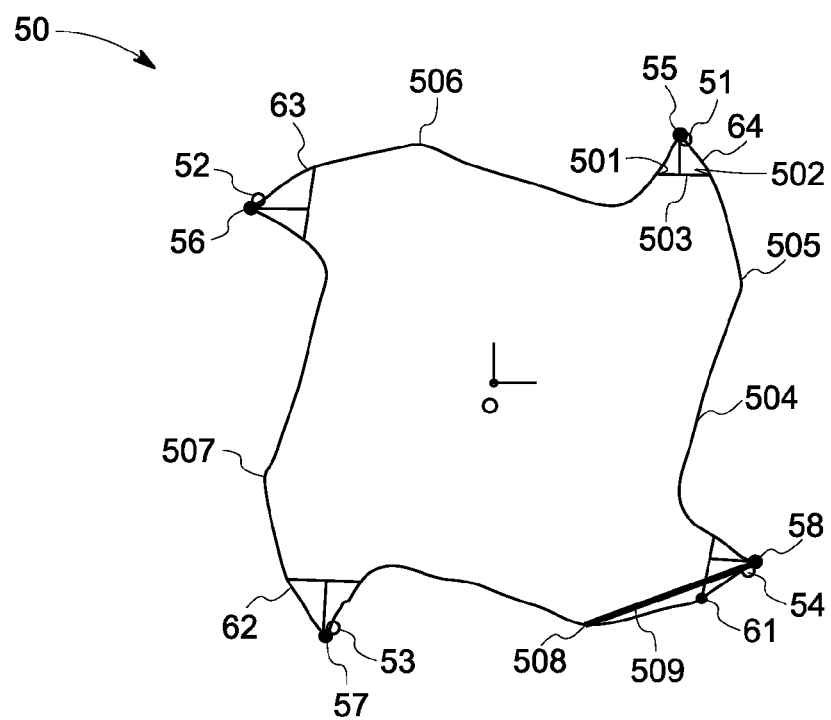
FIG. 10 is a schematic diagram illustrating retrieval of refined cutting edge points based on the initial cutting edge points on the example preprocessed point cloud.

FIG. 10 illustrates a schematic diagram of retrieving the refined cutting edge points based on the initial cutting edge points on the exemplary point cloud 50. As indicated in FIG. 10, the detection of a first refined cutting edge point 55 is taken as an example. First, the initial cutting edge point 51 is set as a base point, and a point set (not labeled), such as a successive ten points, is selected on each side of the base point 51 along the exemplary point cloud 50. Alternatively, the point set may include less than or more than 10 points. Then, end points 501, 502 of two point sets are connected to form a connected line 503. Thus, a local highest point (not labeled) of the points located between the two end points 501, 502 (not shown) may be detected due to having the largest distance from the connected line 503. Subsequently, a point 55 is determined, which has the largest curvature and is located around the local highest point, and the point 55 may be the first refined cutting edge point.

In some examples, the system may predetermine a curvature threshold value. If the largest curvature of the point located around the local highest point exceeds the curvature threshold value, the point may be regarded as the first refined cutting edge point 55. If the largest curvature of the point located around the local highest point is smaller than the curvature threshold value, the local highest point may be regarded as the first refined cutting edge point 55. Similarly, second, third and fourth refined cutting edge points 56-58 may also be determined.

After positioning the desired cutting edge points, such as the initial or refined cutting edge points, the point cloud 50 is segmented into 4 segments. Thus, in some examples, in each segment of the point cloud 50, a point 504 having the shortest distance from the central point O may be positioned. Therefore, the highest point is positioned, which has the furthest distance from a connecting line (not shown) connecting the point 504 and one point near to the corresponding cutting edge point but on the primary relief region. Accordingly, a secondary clearance point 505 may be determined by detecting the largest curvature point in a relatively small local region around the highest distance point. Similarly, other secondary clearance points 506-508 in other segments may also be determined.

As illustrated in FIG. 10, the segment between the cutting edge point 54 or 58 and the secondary clearance point 508 is taken as an example. After being determined, the secondary clearance point 508 may be connected with the cutting edge points 54 or 58 to form a connecting line 509. Then, between the secondary clearance point 508 and the cutting edge point 54 or 58, the highest point (not labeled) away from the connecting lines 509 may be detected. Subsequently, a point around the highest point and having the largest curvature may be positioned, which may be the primary relief point 61. Similarly, other primary relief points 62-64 may be positioned. In certain examples, the cutting edge points, the primary relief points, and the secondary clearance point may be determined by convex hull analysis.

Figure 11:
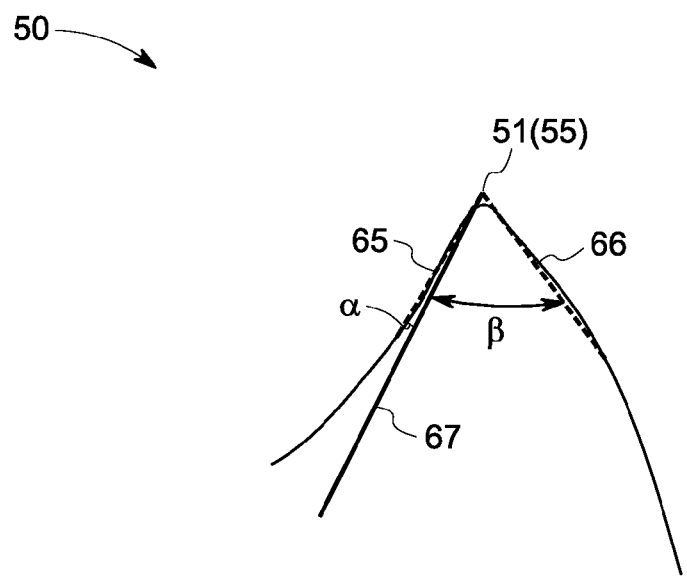
FIG. 11 is a schematic diagram illustrating determination of a rake region of the example preprocessed point cloud.

FIG. 11 illustrates a schematic diagram showing determination of a rake region of the exemplary point cloud 50. As illustrated in FIG. 11, the controller 24 may analyze and fit the points (not labeled) in front of and behind the first cutting edge point 51 or 55 to generate a first fitted line 65 and a second fitted line 66 on cloud point 50 by using, for example the Least Squares Method. In some examples, the first fitted line 65 and the second fitted line 66 may have experimentally fixed length. An angle between the first fitted line 65 and a line 67 connecting the first cutting edge point and the center point O (shown in FIG. 10) may be defined as $\alpha$. An angle between the second fitted line 66 and the line 67 may be defined as $\beta$.

Accordingly, the controller 24 compares the angle $\alpha$ and the angle $\beta$ so as to detect the first rake region based on the smaller angle between the angles α and β. That is, the first fitted line 65 with the small angle a relative to the line 67 indicates the rake region. Similarly, other rake regions may also be detected. Thus, based on desired predetermined measurement depths, rake points may also be detected. As used herein, the measurement depth on a rake region may be the distance from a cutting edge point to a rake point.

In some embodiments, after the initial or refined cutting edge points, the central point, the primary relief points, the secondary clearance points, and the rake points are determined, the parameters including, but not limited to, cutting diameter, primary relief angles, land widths, secondary clearance angles, secondary land widths, rake angles, flute spacing, and concentricity may be extracted. In certain examples, the initial cutting edge points may be used to determine other feature points so as to extract the parameters.

In other embodiments, due to the complexity of the scanning operation, the feature points, such as the initial or refined cutting edge points, and the secondary and primary relief points on the point cloud 50 may still not reflect the respective actual feature points on the corresponding cutting tool. The obtained feature points above belong to the points in the measurement point cloud. However, the process of the measurement itself is a discrete scan. The density of the measurement data is another factor that will affect the available points on the physical features. For example, in different point clouds of the same section of a cutting tool, the positions of the detected feature points may be different. Thus, the extracted parameters related to the corresponding feature points may be not accurate.

Accordingly, theoretical feature points including, but not limited to, theoretical cutting edge points, theoretical primary relief points, and theoretical secondary clearance points may be determined for extracting the related parameters of a cutting tool. After being determined, the theoretical feature points on a section of a cutting tool may be fixed, so that the parameters extracted based on the theoretical feature points may be accurate. In some applications, the theoretical feature points may or may not be physical points on a point cloud.

Figure 12:
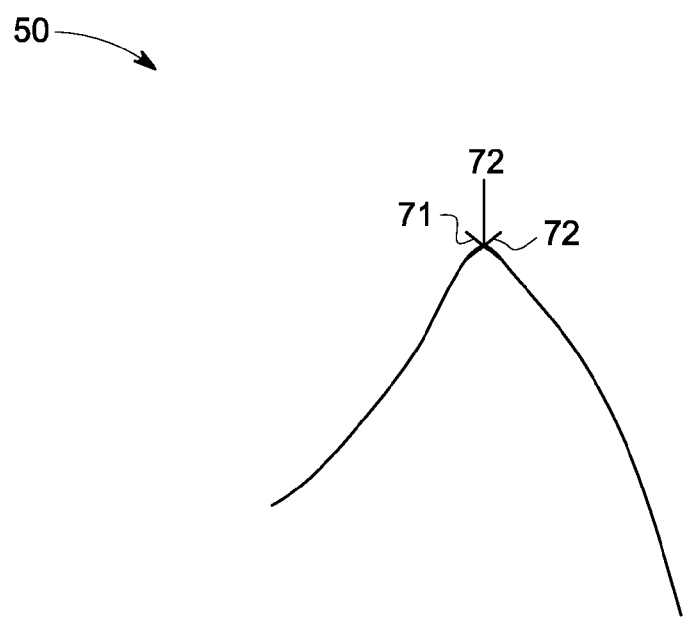
FIG. 12 is a schematic diagram illustrating detection of theoretical cutting edge points in the exemplary processed point cloud.

FIG. 12 illustrates a schematic diagram showing detection of the theoretical cutting edge points in the exemplary preprocessed point cloud 50. Generally, rake angles of a cutting tool may be positive or negative. As indicated in FIG. 12, the exemplary point cloud 50 comprises negative rake angles. Thus, when determining a first theoretical cutting edge point, first, two sets of points (not labeled) may be selected on the exemplary point cloud 50 at two adjacent sides (the rake region and the primary relief region) of one cutting edge point. Then, each set of points is fitted by, for example using the Least Squares Method, to form two lines 70, 71 on the rake region and the primary relief region. Subsequently, the two lines 70, 71 are intersected to form an intersection point 72, which may be the first theoretical cutting edge point. In some embodiments, the lengths of the two lines may be experimentally fixed. Similarly, other theoretical cutting edge points may be positioned. In certain applications, the refined cutting edge points may be used to determine some theoretical feature points.

Alternatively, a cutting tool may comprise positive rake angles (not shown), and the process for determining the theoretical cutting edge points of the cutting tool having negative rake angles may be not suitable. In one non-limiting example, a process for determining a theoretical cutting edge point of a cutting tool having positive rake angles may include: A) forming a first line between one primary relief point and one adjacent cutting edge point; B) finding a second line perpendicular to and having a first intersection point with the first line when the second line is moved to contact periphery of the rake region; C) connecting the first intersection point and the central point O to form a third line; D) moving the third line to contact the periphery of the rake region if the third line does not contact the periphery of the rake region; E) finding a fourth line perpendicular to and having a second intersection point with the third line contacting the periphery of the rake region when the fourth line is moved to contact a relative small periphery of the primary relief region; F) determining whether a distance between the two adjacent intersection points is below a threshold value. If yes, the second intersection point may be the theoretical cutting edge point. If not, the process further comprising: G) repeating steps similar to steps C)-F) based on a prior adjacent intersection point to determine the third or more intersection points until a final intersection point is detected, whose distance from a prior adjacent intersection point is below the threshold value.

In certain applications, after step C and before step F, the process may comprise steps of finding a fourth line perpendicular to the third line and moving the third line to contact the periphery of the rake region if the third line does not contact the periphery of the rake region so that the fourth line has the second intersection point with the third line contacting the periphery of the rake region, which are equivalent to steps C)-E) above.

In other embodiments, as described above, the primary relief point and the secondary clearance point of each segment of the exemplary point cloud 50 can be determined. Accordingly, in each of the four segments of the exemplary point cloud 50, a primary relief line may be determined by fitting the points between one primary relief point and the adjacent cutting edge point. A secondary clearance line (not shown) may also be determined by fitting the points between the primary relief point and the adjacent secondary clearance point. Thus, an intersection point of the primary relief line and the secondary clearance line may be the theoretical primary relief point. In addition, along the counterclockwise direction, a tertiary line, which may have an experimentally determined length, may be determined by fitting the points located after the secondary clearance point, and an intersection point of the secondary clearance line and the tertiary line may be the theoretical secondary clearance point. Similarly, other theoretical primary relief points and theoretical secondary clearance points may be determined.

In some embodiments, as illustrated in FIG. 2, the measurement system 20 may control the range sensor 23 and the first stage 220 holding the cutting tool 10 to move cooperatively, so that the lens 32 faces a second desired section of the side portion 121 spaced away from the first section with a desired distance. Then, the first scan and/or the second scan implemented on the first section may be used for scanning the second section to retrieve a point cloud of the second section. Similar to the analysis of the point cloud of the first section, the controller 24 may analyze the point cloud of the second section to detect the desired feature points and extract the parameters therefrom. Similarly, the point cloud of the second section may be or not be preprocessed prior to extraction of the parameters. In addition, other sections of the cutting tool may be analyzed to detect the respective desired feature points and to extract the respective parameters.

When the respective desired feature points of more than one section are detected, some spatial parameters may be determined. In certain embodiments, the spatial parameters may include, but are not limited to, helix angles, helical pitches, taper angles, chamfer angles, point included angles for a drill, notch radiuses and notch angles for a drill, axial rake angles, axial relief angles and axial land widths for a flat end mill, center notch included angles, center notch widths, center notch radiuses, and center notch clearance angles for a flat end mill. For example, the helix angle may be determined based on the corresponding cutting edge points on two sections. In certain examples, the spatial parameters may be extracted based on the theoretical feature points, such as the theoretical cutting edge points, the theoretical primary relief points, or the theoretical secondary clearance points to improve the accuracy of the related parameters.

In other examples, the controller 24 may compare more than one point cloud retrieved from different sections of the same cutting tool, from the same section at different times, or from the sections of different cutting tools. It should be noted that the compared point clouds may have the same flute number. Thus, variations of geometry shapes of the cutting tool(s) and/or associated performance may be determined. In one non-limiting example, the compared point clouds may be the secondary scanning point clouds of sections, and may be preprocessed.

Figure 13A:
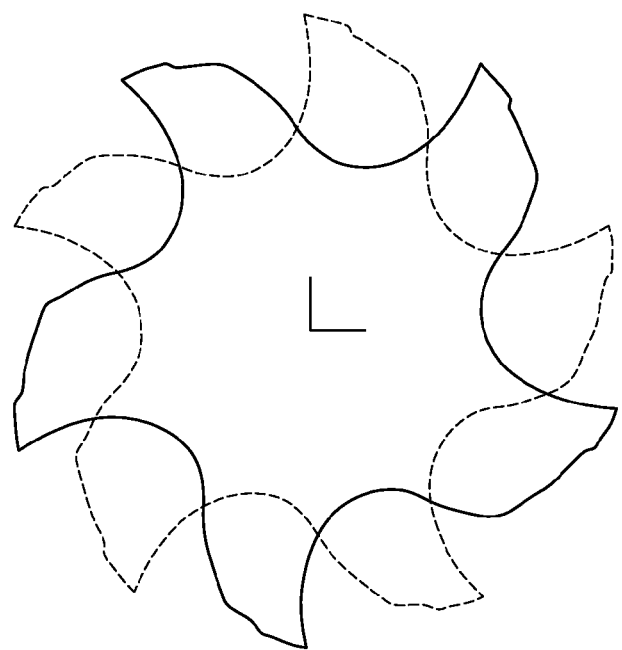
FIGS. 13(a)-13(b) are schematic diagrams illustrating an example comparison of two sections of an example cutting tool.
Figure 13B:
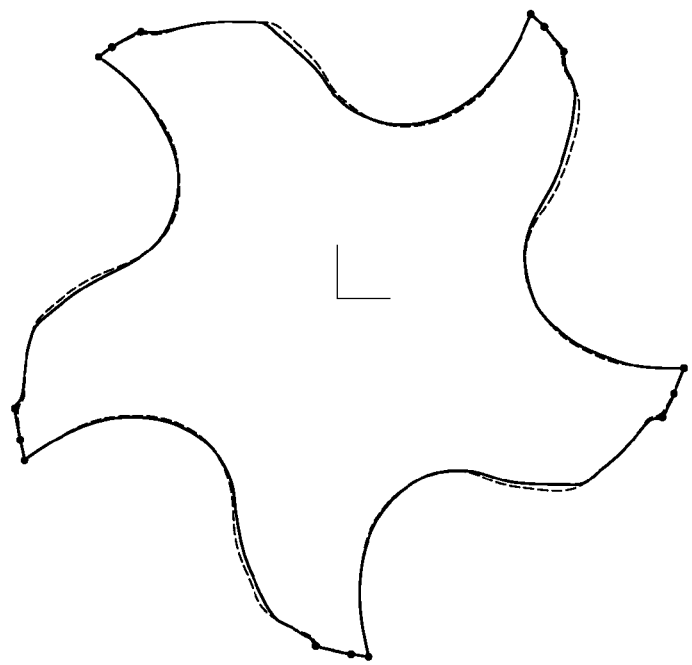

FIGS. 13(*a*)-13(*b*) illustrate a comparison of two exemplary sections corresponding the same section of an example cutting tool but retrieved at different times. When comparing, as illustrated in FIG. 13(*a*), first, the theoretical feature points, such as the corresponding theoretical cutting edge points on the two point clouds may be determined. Thus, as illustrated in FIG. 13(*b*), based on the overlap of the corresponding theoretical cutting edge points, the two point clouds may be aligned with each other, so that the differences therebetween may be determined. Additionally, other theoretical feature points, such as the theoretical primary or secondary clearance points may be used to perform the alignment for comparison. In certain applications, the feature points used for comparison may not be theoretical feature points.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the subsequent claims.

What is claimed is:

1. A method for extracting parameters of a cutting tool, the method comprising:
    positioning the cutting tool on a moveable stage;
    performing one or more rotary scans of a first section of the cutting tool to generate a scanning point cloud;
    indexing a plurality of points of the scanning point cloud;
    detecting one or more feature points based on the indexed scanning point cloud; and
    extracting one or more parameters based on the detected feature points,
    wherein performing one or more rotary scans of the first section to generate the scanning point cloud comprises performing a first rotary scan of the first section to generate a first scanning point cloud, segmenting the first scanning point cloud, and performing a second rotary scan of the first section based on the segmentation of the first scanning point cloud to generate a second scanning point cloud, and wherein the scanning point cloud comprises the second scanning point cloud.

2. The method of claim 1, wherein segmenting the first scanning point cloud of the first section comprises performing a first segmentation of the first scanning point cloud into a plurality of segments.

3. The method of claim 2, wherein segmenting the first scanning point cloud further comprises performing a second segmentation of one or more of the segments in the first segmentation into a plurality of scanning paths, and wherein the second rotary scan is performed along at least one of the scanning paths.

4. The method of claim 1, further comprising preprocessing the scanning point cloud before indexing the points of the scanning point cloud.

5. The method of claim 4, wherein preprocessing the scanning point cloud comprises performing one or more of decimating points, removing outliers, smoothing, removing overlapped points, sorting and re-sampling of the scanning point cloud.

6. The method of claim 1, wherein the feature points comprise one or more of cutting edge points, primary relief points, secondary clearance points, and rake regions.

7. The method of claim 6, wherein the cutting edge points comprise one or more of initial cutting edge points, refined cutting edge points, and theoretical cutting edge points.

8. A method for extracting parameters of a cutting tool, the method comprising:
    positioning the cutting tool on a moveable stage;
    performing one or more rotary scans of a first section of the cutting tool to generate a scanning point cloud;
    indexing a plurality of points of the scanning point cloud;
    detecting one or more feature points based on the indexed scanning point cloud; and
    extracting one or more parameters based on the detected feature points, wherein the cutting edge points comprise one or more of initial cutting edge points, refined cutting edge points, and theoretical cutting edge points, and wherein detecting the cutting edge points comprises detecting a first initial cutting edge point having a furthest distance from a central point of the scanning point cloud, and detecting at least one of other initial cutting edge points based on the index of the points and a flute number of the scanning point cloud.

9. The method of claim 8, wherein detecting the refined cutting edge points comprises setting two point sets at two sides of each initial cutting edge point, connecting ends of the respective two point sets to form connected lines, determining highest points away from the respective connected lines and located between the respective two end points, and determining points having respective largest curvatures and located around the respective highest points, wherein the points having respective largest curvatures are the refined cutting edge points if the largest curvatures are larger than a curvature threshold value, and wherein the highest points are the refined cutting edge points if the largest curvatures are smaller than a curvature threshold value.

10. The method of claim 9, wherein detecting the theoretical cutting edge points comprises fitting two lines at two sides of each refined cutting edge point, and intersecting the respective two lines to form the theoretical cutting edge points.

11. The method of claim 8, wherein detecting the theoretical cutting edge points comprises A) forming a first line between one primary relief point and one adjacent cutting edge point; B) finding a second line perpendicular to and having a first intersection point with the first line when the second line is moved to contact periphery of the rake region; C) connecting the first intersection point and the central point to form a third line; D) moving the third line to contact the periphery of the rake region if the third line does not contact the periphery of the rake region; E) finding a fourth line perpendicular to and having a second intersection point with the third line contacting the periphery of the rake region when the fourth line is moved to contact a relative small periphery of the primary relief region; and F) determining whether a distance between the first and second intersection points is below a threshold value, and wherein the second intersection point is the theoretical cutting edge point if the distance between the two intersection points is below a threshold value.

12. The method of claim 11, wherein detecting the theoretical cutting edge points further comprises repeating steps similar to steps C)-F) based on a prior adjacent intersection point to determine a third or more intersection points until a final intersection point is detected if the distance between the two intersection points is larger than the threshold value, and wherein a distance from the final intersection point to a prior adjacent intersection point is below the threshold value.

13. The method of claim 1, further comprising:
performing one or more rotary scans of a second section of the cutting tool to generate a scanning point cloud;
indexing a plurality of points of the scanning point cloud of the second section;
detecting one or more feature points based on the indexed scanning point cloud of the second section; and
extracting one or more parameters based on the detected feature points.

14. A method for extracting parameters of a cutting tool, the method comprising:
positioning the cutting tool on a moveable stage;
performing one or more rotary scans of a first section of the cutting tool to generate a scanning point cloud;
indexing a plurality of points of the scanning point cloud;
detecting one or more feature points based on the indexed scanning point cloud;
extracting one or more parameters based on the detected feature points;
performing one or more rotary scans of a second section of the cutting tool to generate a scanning point cloud;
indexing a plurality of points of the scanning point cloud of the second section;
detecting one or more feature points based on the indexed scanning point cloud of the second section; and
extracting one or more parameters based on the detected feature points, wherein performing one or more rotary scans of the second section to generate the scanning point cloud comprises performing a first rotary scan of the second section to generate a first scanning point cloud, segmenting the first scanning point cloud, and performing a second rotary scan of the second section based on the segmentation of the first scanning point cloud to generate a second scanning point cloud, and wherein the scanning point cloud comprises the second scanning point cloud.

15. The method of claim 14, wherein the feature points comprise theoretical feature points, and wherein the method further comprises aligning the scanning point clouds of the first section and the second section with each other based on an alignment of the respective theoretical feature points.

16. A system for extracting parameters of a cutting tool, the system comprising:
a stage configured to position the cutting tool;
a range sensor configured to scan the cutting tool; and
a controller configured to:
control the range sensor to perform one or more rotary scans of a first section of the cutting tool to generate a scanning point cloud,
index a plurality of points of the scanning point cloud,
detect one or more feature points based on the indexed scanning point cloud, and
extract one or more parameters based on the detected feature points, wherein the controller performs a first rotary scan of the first section to generate a first scanning point cloud, and segments the first scanning point cloud, and further performs a second rotary scan of the first section based on the segmentation of the first scanning point cloud to generate a second scanning point cloud, and wherein the scanning point cloud comprises the second scanning point cloud.

17. The system of claim 16, wherein the controller first segments the first scanning point cloud into a plurality of segments and then segments one or more of the segments into a plurality of scanning paths.

18. The system of claim 16, wherein the controller is configured to preprocess the scanning point cloud prior to indexing the points of the scanning point cloud.

* * * * *